Nov. 10, 1953  K. C. NICHOLSON  2,658,332
FLUID COOLED, REFRACTORY, CERAMIC LINED ROCKET STRUCTURE
Filed March 21, 1951  3 Sheets-Sheet 2

INVENTOR.
KENNETH C. NICHOLSON
BY
ATTORNEY

Nov. 10, 1953 K. C. NICHOLSON 2,658,332
FLUID COOLED, REFRACTORY, CERAMIC LINED ROCKET STRUCTURE
Filed March 21, 1951 3 Sheets-Sheet 3

INVENTOR.
KENNETH C. NICHOLSON
BY
ATTORNEY

Patented Nov. 10, 1953

2,658,332

UNITED STATES PATENT OFFICE 2,658,332

FLUID COOLED, REFRACTORY, CERAMIC LINED ROCKET STRUCTURE

Kenneth C. Nicholson, Niagara Falls, N. Y., assignor to The Carborundum Company, Niagara Falls, N. Y., a corporation of Delaware Application March 21, 1951, Serial No. 216,757

10 Claims. (Cl. 60—35.6)

This invention relates to devices for the combustion and directional release of hot gases, as for example, rocket motor structures, designed for the combustion of solid or liquid fuels wherein the fuel is burned in a combustion chamber or zone and the hot gases and other products of combustion are released at high velocity through a discharge port or nozzle of restricted crosssection.

The highly corrosive and erosive conditions existing within devices of the above type have long been considered to require, at least in the throat area, materials of high density and very refractory properties. Consequently, such structures heretofore have been made almost entirely of dense, heavy refractory materials backed up by substantial amounts of a refractory supporting cement, the structure being so designed in order to stand up under severe conditions of use with little or no regard or consideration apparently being given to the overall weight of the device although it is also highly desirable, particularly where such structures are used in airborne devices, that the weight of the device be kept to a minimum. It has also been the practice in the fabrication of ceramically lined devices of the herein-described type to rely entirely upon the ability of the particular ceramic composition selected for the inner lining to give acceptable useful operating life to the device.

It is an object of the present invention to provide rocket motor structures and comparable devices of improved design and construction which not only possess satisfactory resistance to breakdown under the severe conditions of use to which they are commonly subjected but are also relatively light in weight.

It is also an object to provide ceramically lined rocket motor structures and comparable devices of improved design and construction in which the useful operating life of the article is lengthened beyond the usual life expectancy of the lining composition through the embodiment therewith in the device of means for cooling the lining or specific portions thereof.

Other objects and advantages accuring from the the preesnt invention will become apparent as the description proceeds.

Rocket motor structures and like devices with which the present invention is concerned usually comprise a cylindrical combustion chamber tapering or converging toward or at one end to provide a restricted opening or nozzle for release of the high velocity, hot gases of combustion from the combustion chamber. The other end of the combustion chamber is open and provided with a suitable flange or other means for attachment to a suitable injector head for the injection and burning of liquid propellants or fuels, or the end opposite the discharge end is closed in the case of combustion chambers specificially designed for the burning of solid propellants or fuels. At the outer end of the nozzle or discharge port the inner lining walls of the device flare to form an exit or tail cone through which the hot gases are dispersed as they leave the nozzle.

In accordance with the present invention a rocket motor structure or other device for the combustion of solid or liquid propellants or fuels and directional release of high velocity, hot gases and other products of combustion is provided with an inner ceramic refractory lining wall composed of bonded silicon carbide or other suitable ceramic refractory material resistant to the high temperatures and severe corrosive and erosive conditions developed in the combustion chamber and nozzle throat in combination with means for transmitting a fluid coolant through the pores of said lining or otherwise providing means for imparting a cooling action to at least a portion of the ceramic lining so as to provide a further protection against corrosion or erosion of the lining beyond that offered by the natural resistance of the lining composition. The inner refractory lining wall extends from the rear or injector head end of the combustion chamber through the nozzle to the outer end of the flared walls of the exit or tail cone, and is usually of uniform thickness throughout the length of the device with the wall thickness maintained at a minimum figure consistent with acceptable mechanical strength and resistance to breakdown during use in order to keep the weight of the device at a minimum. This inner refractory wall lining is made from one or more molded, prefired circular segments of the bonded refractory composition selected for the purpose. When more than one segment is used to form the lining of the device, each one of the segments may be of the same composition as, or different in composition from, the composition or compositions of the other remaining segments. According to a preferred embodiment of the present invention, satisfactory performance is to be obtained by the use of a dense, prefired silicon carbide refractory lining composition for the major portion of the combustion chamber wall and for the greater part of the walls of the exit or tail cone, with a similar silicon carbide composition, which in certain specific modifications of the invention is of more porous body structure, utilized for the inner lining wall of the nozzle or throat portion of the device for reasons which will be explained more fully herein as the description proceeds. The inner refractory lining wall is backed up or supported by a layer or mass of refractory cement which serves to seat the wall lining in an encircling outer metal shell which contains the overall device and is designed with a flange at one end for mounting upon an injector head.

In further accordance with the present invention, the rocket motor structure or similar device of the herein-described type is also provided, as stated above, with means for cooling the inner refractory wall, particularly of the nozzle or throat portion of the device by the introduction of a fluid coolant which according to one modification of the invention is forced through the pores of the inner refractory wall to the inner surface thereof where the fluid coolant, if not already in vapor form, is vaporized to form a thin protective layer of coolant which flows along the inner wall of the nozzle or throat portion to provide an added protection against oxidation or other chemical or physical attack by the rapid flow of the hot gases and products of combustion through the nozzle. One satisfactory manner of introducing a fluid coolant to the inner walls of the nozzle or throat of the device is by means of a hollow ring-shaped conduit or pipe embedded within the refractory cement which backs up the inner refractory nozzle wall lining and encircles the lining at a slight distance therefrom. This conduit or pipe is provided with a number of small perforations or apertures spaced about its inner periphery, and is suitably connected to one or more branch or lead-in pipes extending outwardly from the ring-shaped conduit through the confining metal shell of the device and connected to a suitable source of fluid coolant. In order to promote the easy flow of the cooling fluid from the pipe through the surrounding refractory embedding cement the latter material can be, if desired, rendered more porous by the inclusion in the refractory cement used in at least that portion of the device of a foaming or pore-forming agent such as hydrogen peroxide or the like.

According to another modification of the present invention that part of the lining wall of the device where the threat of corrosion and erosion is greatest, as for example the inlet cone area of the nozzle is composed of a ceramic material of high thermal conductivity such as a bonded silicon carbide body, which in turn is backed up by a refractory cement layer which is also highly conductive thermally, the refractory cement mass having embedded therein means for carrying fluid coolant, whereby heat is conducted away from the nozzle wall and dissipated instead of building up at the nozzle wall to the point where it becomes detrimental.

As pointed out above, the inner refractory lining wall of the nozzle, in those modifications of the present invention wherein the coolant passes through the inner lining, is preferably made of more porous body structure than the remainder of the refractory lining walls of the device in order to promote the preferential flow of coolant through the nozzle wall. The added porosity can be obtained by the inclusion of a suitable amount of combustible material in the raw batch from which the lining section of the nozzle is made whereby the material is burnt out or otherwise volatilized during the prefiring of the lining, or alternatively, porosity can be secured by the selection of a combination of grit sizes of the refractory particulate material from which the body is made so as to provide additional pores therethrough. This latter technique has one advantage over the use of pore-forming substances in that the pores when so created have a greater tendency to be of an intercommunicating nature rather than being more or less isolated from one another.

In order that the invention may be more fully understood, reference is made to the drawing, the various figures of which depict specific and illustrative rocket motor structures embodying the various features of the present invention and in which, Figure 1 is a lengthwise sectional view through the diameter of a rocket motor structure made in accordance with the teachings of the present invention;

Figure 1:
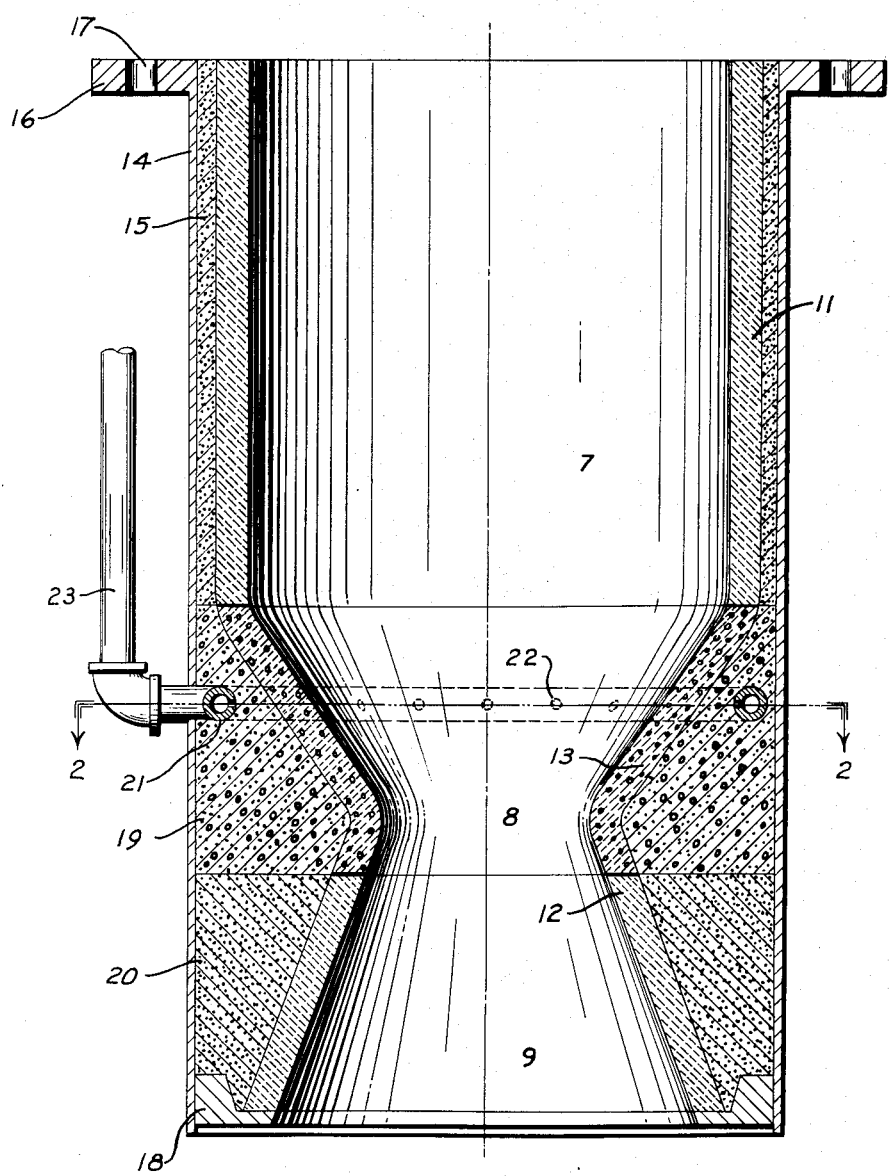
Figure 2:
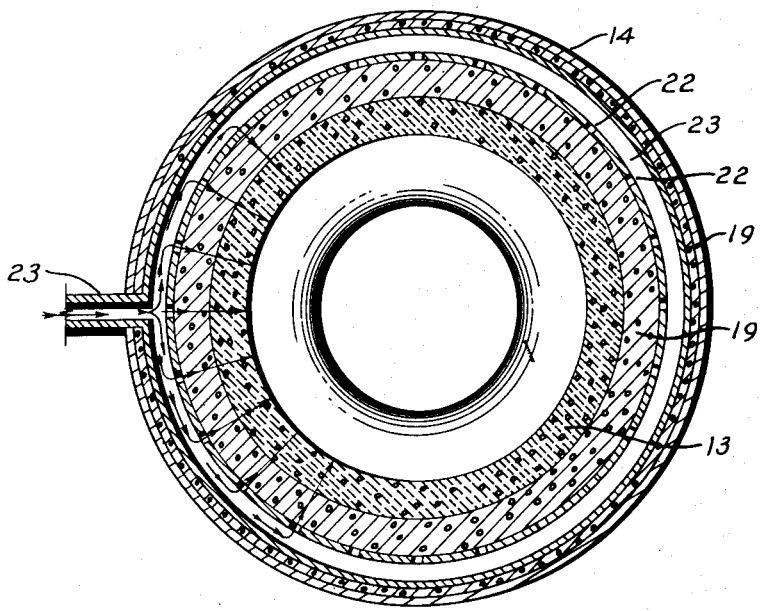
Figure 2 is a cross-sectional view through the line 2—2 of Figure 1.

Referring further to Figures 1 and 2 of the drawing, the specific rocket motor structure shown comprises a combustion zone or chamber 7, a restricted discharge port or opening 8 and an exit or tail cone zone 9. The inner wall or lining 11 of the combustion chamber 7 and the wall or lining member 12 of the exit or tail cone 9 are constructed in the specific device illustrated of premolded and prefired bonded silicon carbide refractory material which is of sufficient density, hardness and refractoriness to satisfactorily stand up under the high temperatures and corrosive and erosive conditions existing within the combustion chamber 7 and the exit cone 9 during the burning of various fuel mixtures and release of resulting hot gases. The inner lining wall 13 which forms the nozzle or discharge opening 8 is also composed of a premolded and prefired bonded silicon carbide refractory material in which, however, the silicon carbide particles are predominantly of coarse grit size with a smaller amount of fine silicon carbide particles so that after firing of the wall member it is provided with a body structure which is more porous and open in character than the adjoining wall lining 11 of the combustion chamber and wall lining 12 of the exit cone.

A bonded silicon carbide material which has been found highly satisfactory as an inner lining material in the present device is that described in a copending patent application Serial No. 68,375, filed December 30, 1948. Briefly, that material can be described as being composed of granular silicon carbide held together by a bond of boron carbide and boron nitride.

The inner refractory lining members 11, 12 and 13 constituting the inner walls of the combustion chamber, tail cone and nozzle, respectively, are seated in a confining cylindrical metal shell 14 by means of an intervening layer or mass 15 of castable refractory cement, such as an hydraulically setting calcium aluminate cement. The shell 14 is provided with a mounting flange 16 with bolt holes 17 for bolting it or otherwise attaching it to an injector head. The metal shell at the exit end is provided with an inner shoulder or ring 18 which extends radially inward so as to engage the outer end of the exit cone lining member 12 and act as an added reinforcement to prevent its becoming displaced during use. That portion 19 of the refractory cement backing up the nozzle wall 13 is provided with a higher porosity than the remainder of the refractory cement by the inclusion of a foaming or pore-forming agent such as hydrogen peroxide within the material.

A circular hollow conduit or pipe 21 is positioned within the mass 19 of porous cement backing up the nozzle wall 13. This pipe is provided with a plurality of perforations or apertures 22 spaced about the entire inner periphery of the pipe. It is also provided with an outwardly extending branch or lead-in pipe 23 which extends through the metal confining shell 14 to connect with a suitable exterior source of fluid coolant.

A rocket motor structure of the above-described type and as shown in Figures 1 and 2 of the drawing can be made in the following manner. The lining piece 11, which forms the walls of the combustion chamber 7, because of its length and relative thinness is usually formed by jolting or tamping, whereas the nozzle lining piece 13 and exit or tail cone lining piece 12 are usually formed by pressing the same mixture in a steel mold at suitable pressure, such as at 5,000 pounds per square inch pressure in a hydraulic press. The following composition, prepared as described, is used for forming the combustion chamber lining member 11 and the tail cone lining member 12:

| | Parts by weight |
|---|---|
| 30 grit size silicon carbide grain | 33 |
| 46 grit size silicon carbide grain | 33 |
| 180 grit size silicon carbide grain | 4 |
| 320 grit size boron carbide ($B_4C$) | 30 |

6% by weight of a temporary binder such as a 10% aqueous solution of polyvinyl alcohol, for example, is added to the above mixture and the material well mixed to form a pressure-moldable mass. Although a water solution of polyvinyl alcohol is specified as the temporary binder in the above mixture any of those materials commonly used for temporary binders in ceramic mixes such as dextrin, concentrated waste cellulose sulfite liquors and powders, various resins and the like can be used.

The following composition is used for forming the nozzle lining member 13 which is desired to be of more porous body structure:

| | Parts by weight |
|---|---|
| 14 to 36 grit size silicon carbide grain | 35 |
| 40 to 70 grit size silicon carbide grain | 35 |
| 320 grit size boron carbide ($B_4C$) | 30 |

The above mixture is prepared with the same amount of temporary binder and also is suitable for molding by either jolting, tamping or pressing as the size and shape of the piece may require.

Instead of altering the combination of grit sizes of silicon carbide from which the composition is made in order to obtain greater porosity in the lining member for the nozzle in relation to the porosity of the combustion chamber and tail cone lining members, the composition used for the latter can be otherwise altered to render it more porous, and as altered, used for making the nozzle lining member. For example, by incorporation of a pore-forming material such as ground coke or carbon, sawdust, or other filler material which will be combustible in the process of firing the piece within the raw batch composition from which the article is molded, the fired shape can be rendered more porous. An increase in porosity can also be obtained by molding the article at lower pressures than are used for the fabrication of the combustion chamber or tail cone lining members.

The thusly formed shapes are dried at 225°–250° F. and then placed in a graphite-lined chamber of a high frequency electric furnace with the shapes standing on a pedestal of graphite. An inlet tube made of graphite is used to pass nitrogen gas into the furnace chamber. A graphite plate, used to cover the top of the furnace, is provided with a hole in the center which serves as a vent for the gases created during the burning operation and also permits temperature readings to be taken of the furnace interior by means of an optical pyrometer. The furnace is heated to an approximate temperature of 700° C. and held at that temperature until the temporary binder is burned off. A nitrogenous atmosphere is provided in the furnace chamber by introducing a stream of commercial grade dry nitrogen gas from a tank under pressure through the graphite inlet tube. Having established an atmosphere of nitrogen within the furnace, the furnace is rapidly heated until a temperature of 2250°–2275° C. is reached. The temperature is then held at 2250°–2275° C. for 30 minutes after which the electric power is shut off and the furnace allowed to cool while maintaining a flow of nitrogen into the furnace.

A chemical analysis of a lining segment made in accordance with the above example shows the following composition for the fired body:

| | Per cent |
|---|---|
| Silicon | 44.96 |
| Carbon | 26.33 |
| Boron | 18.66 |
| Nitrogen | 9.94 |
| | 99.89 |

Assuming that all the silicon is combined with carbon as silicon carbide and that all the nitrogen is present as boron nitride, BN, the following is the calculated composition of the fired article:

| | Per cent |
|---|---|
| Silicon carbide, SiC | 64.2 |
| Boron nitride, BN | 17.6 |
| Boron carbide, $B_4C$ | 14.03 |
| Uncombined carbon | 4.04 |
| | 99.87 |

It is known that silicon nitride decomposes at around 1900° C. and, since the article was heated to 2250°–2275° C. it appears likely that the nitrogen which is taken up enters the composition by reason of reaction with a portion of the boron carbide, the nitrogen replacing carbon under these conditions to form boron nitride.

Although it is usually preferred to form the lining members by an edge tamping procedure because of their length and relatively thin wall thickness which render the machine pressure molding of said shapes difficult, and the combustion chamber lining member has been disclosed as being so formed, and other lining members have been disclosed as being machine molded, it is not desired to restrict the methods of making any of the specific lining pieces to the specific forming techniques described above since any of those pieces can be made of the above compositions by any conventional molding or forming procedure found acceptable for making a piece of the desired shape and size, such as by pressure molding, hand or machine tamping, air hammer tamping, jolting or slip-casting.

The inner refractory lining pieces can also be made of other suitable bonded silicon carbide refractory compositions. For example, another material which has been found satisfactory for such use is that described in a copending patent application Serial No. 83,767, filed March 26, 1949. That material can be briefly described as consisting of a body of granular silicon carbide bonded by an interstitial carbide bond of boron and zirconium carbides, or boron carbide, silicon carbide and zirconium carbide. Other lining compositions which have been used with satisfaction include variously bonded silicon carbide bodies.

Having molded and fired the inner lining members for the combustion chamber, nozzle and tail cone, the rocket motor structure is assembled by setting the tail cone lining member 12 in the cylindrical metal shell 14 so that it is seated and centered on the end ring 18 of the metal shell as shown in Figure 1 of the drawing. After the ring-shaped member 21 and connecting lead-in pipe 23 have been mounted on place in the space between the nozzle lining 13 and metal shell in a position intermediate of the ends of the nozzle lining, the nozzle lining member 13 is superimposed upon the tail cone wall 12, and the combustion chamber lining piece 11 in turn superimposed upon the nozzle member 13, all three lining pieces being in axial alignment with one another and centered in respect of the confining metal shell 15. If desired, a thin layer of cement such as a mixture of fine zirconium oxide and sodium silicate solution can be inserted between the adjoining ends of the lining members to further hold them in proper alignment during the introduction of the refractory cement between the lining members and the confining metal shell.

After the lining members have been thusly assembled the intervening space between the outer metal shell 14 and the tail cone lining member 12 is filled with a castable refractory cement 20. One castable refractory cement which has been found satisfactory for such use is a calcium aluminate cement such as that sold by the Universal Atlas Cement Company of 100 Park Avenue, New York 17, N. Y., under the trade-mark name of "Lumnite" cement. A typical analysis of such an hydraulically setting calcium aluminate cement is alumina 45%, lime 35%, iron oxide 15% and silica 5%. Other suitable compositions for use as the refractory cement which is used to seat the tail cone member include aluminum oxide-sodium silicate compositions and zirconia-sodium silicate compositions.

After the refractory cement mass 20 has been poured and allowed to partially harden or set, another portion 19 of the cement, to which has been preferably added pore-forming material such as hydrogen peroxide, is introduced between the metal shell 14 and the nozzle lining member 13 in an amount sufficient to bring the top level of the poured refractory cement mass to the top edge of the lining member 13. After the increment of cement containing the pore-forming material has been allowed to at least partially harden or set a further increment of the same refractory cement used for the initial increment backing up the exit cone is poured into the space between the combustion chamber lining member 11 and the confining metal shell 14.

After the final increment of refractory cement has been poured and the entire mass allowed to harden or set, which usually takes about 24 hours, the entire structure is oven-dried at 200°–250° F overnight. The rocket motor is then ready for use.

In a further modification of the present invention, which is additionally illustrative of the way in which compositions of different porosities can be used for the various lining members, the lining members 11 and 12 of the combustion chamber and tail cone, respectively, can be made of the dense bonded silicon carbide refractory compositions set forth above, whereas the lining member 13 of the nozzle or throat portion of the device can be formed of a different bonded silicon carbide refractory composition of lesser density and having the following composition:

| | Parts by weight |
|---|---|
| 80 and finer silicon carbine grain | 85 |
| Ferromanganese-silicon powder | 15 |
| Dry lignone | 3 |

The ferromanganese silicon used is in finely divided form. In mixing the various ingredients the ferromanganese silicon powder is thoroughly mixed dry with the fine fraction of silicon carbine and the dry temporary binder, after which it is mixed with the coarser silicon carbine grain in the dry state, followed by mixing wet in an ordinary kneader mixer, sufficient water being added to bring the batch to a pressing or tamping consistency, depending upon the molding method to be used for fabricating the particular lining piece. When machine molding technique is used the shape is usually formed in a hydraulic press at a pressure in excess of 5,000 pounds per square inch. Regardless of the method of forming the article, the shaped articles are then dried in the usual manner at 220° F. and finally fired in a kiln at 1450° C. One method of firing such bonded silicon carbide bodies is in a reducing atmosphere such as that obtained by embedding the articles in a mixture of coke and sand during the firing operation. The firing may be carried out at any temperature between 1300°–1450° C.

In use, a supply of water or other liquid coolant is transmitted under pressure from a suitable external source through the supply pipe 23 into the cooling ring 21 where it is forced under pressure out through the apertures 22 which are spaced about the ring into the surrounding mass of porous refractory cement. The arrows in Figure 2 show the direction of flow of the coolant through the cooling ring and into the inner lining wall. The walls of the nozzle lining 13, being porous in nature, are consequently filled with the liquid coolant which is forced through the walls to the inner surface of the nozzle lining 13 where the water or other fluid coolant is vaporized and carried by the outward flow of gaseous combustion products along the inner surface of the nozzle lining in the form of a thin gaseous film. This moving film which is thusly created along the inner walls serves to additionally protect the inner wall of the nozzle not only by its mechanical presence but also by reason of the cooling effect which is brought about by the constant flow of additional coolant through the walls and along the surface of the nozzle lining. This added protection to the nozzle wall which is considered to constitute the zone of greatest erosion and corrosion in rocket motor structures permits the use in that zone of materials which would otherwise be unsatisfactory for the purpose.

Figure 3:
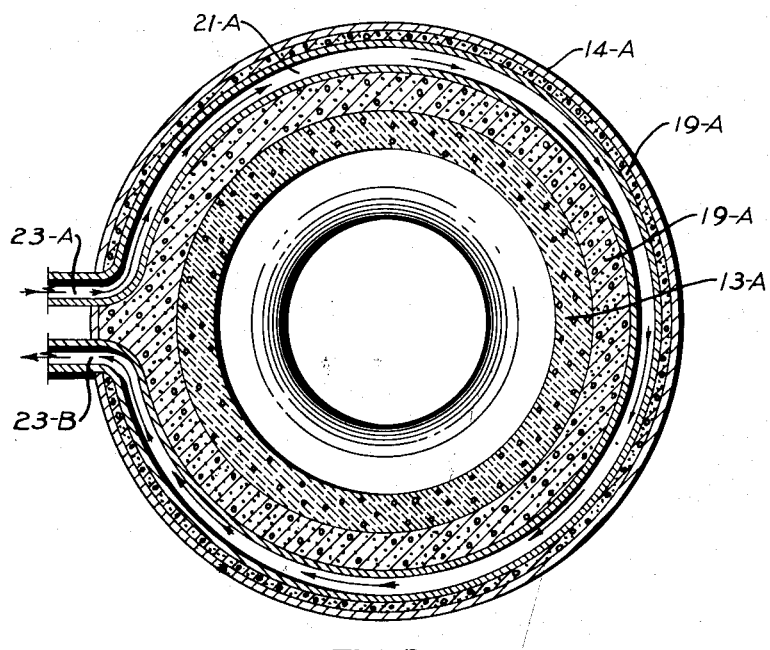
Figure 3 is a view similar to Figure 2, but showing a modified form of the present invention wherein, instead of passing the coolant through the inner lining wall the coolant is circulated through a conduit embedded in the supporting layer of refractory cement and is used in conjunction with ceramic materials of relatively high heat conductivity for the inner lining wall.

Reference is now made to Figure 3 which depicts a modified form of the present invention, and in which an alternate method of cooling the inlet cone area of a nozzle made of a relatively non-porous or dense silicon carbide refractory composition is provided. The specific manner of cooling will become apparent from the following description. That portion of the refractory cement 19a backing up the convergent section of a relatively non-porous silicon carbide nozzle lining member 13a comprises a silicon carbide refractory cement composition which will have relatively high heat conductivity because of the high silicon carbide content (in excess of 50% silicon carbide). Embedded in this supporting cement 19a is a cooling manifold 21a. This manifold 21a is not perforated with holes or apertures as provided in the manifold of the device pictured in Figures 1 and 2, but is provided with an inlet and an outlet connection 23a and 23b, respectively, so that a cooling fluid may be circulated through the manifold. Due to the relatively high heat conductivity of the convergent section of the silicon carbide nozzle 13a and to the relatively high heat conductivity of the silicon carbide embedding cement, the heat from the hot face of the nozzle is rapidly conducted through the convergent nozzle wall, thence through the embedding cement, thence to the cooling fluid in the manifold from which it is conducted outside the rocket, thus materially lowering the temperature of the hot face of the convergent section of the silicon carbide nozzle. The entire device is housed in a confining metal shell 14a.

One satisfactory cement having relatively high heat conductivity which is satisfactory as the cement for backing up the nozzle section 13a has the following composition:

| | Per cent by weight |
|---|---|
| Silicon carbide, 80 mesh and finer | 73 |
| Sodium silico fluoride | 2 |
| Sodium silicate solution | 25 |

A satisfactory sodium silicate solution is the "O" grade sodium silicate made by the Philadelphia Quartz Company, Philadelphia, Pennsylvania.

Rocket motor structures and other similar devices constructed in accordance with the present invention have the advantage of providing a light weight structure without sacrificing any appreciable resistance to high temperatures and erosive conditions normally involved in the use of such mechanisms. Moreover, the described devices are easily constructed and the cost is reduced due to the saving in the amount of more costly lining materials required for the fabrication of such pieces. The provision of a certain degree of added protection from corrosion and erosion at the nozzle or throat by the use of coolant vapors introduced through the porous nozzle walls permits the use of materials at this point which would be otherwise incapable of surviving under the exacting conditions normally prevalent. These advantages are provided by reason of the various individual features of the lining members in combination with the way in which those lining members are assembled and combined with the cooling means to form the overall device.

Having described the invention in detail it is desired to claim:

1. A device for the combustion and directional release of hot gases comprising a combustion chamber having the walls thereof composed of a dense, hard, prefired ceramic refractory body, a discharge nozzle adjoining the combustion chamber with the end of the nozzle abutting the forward end of the combustion chamber walls and converging therefrom to a nozzle throat of reduced cross-sectional area, the walls of said nozzle being composed of a porous but hard, prefired ceramic refractory body, and an exit cone adjoining said nozzle, said exit cone walls being composed of a dense, hard prefired ceramic refractory body, the aforesaid combustion chamber, nozzle and exit cone being encased in axial alignment in an outer cylindrical metal shell and seated therein by an intervening mass of refractory cement, and cooling means embedded in said refractory cement encircling the nozzle walls for introducing a fluid coolant to the refractory walls of said nozzle.

2. A device for the combustion and directional release of hot gases in accordance with claim 1 in which the ceramic refractory lining members are composed of bonded silicon carbide compositions.

3. A device for the combustion and directional release of hot gases comprising a combustion chamber having the walls thereof composed of a dense, hard, prefired ceramic refractory body, a discharge nozzle adjoining the combustion chamber with the end of the nozzle abutting the forward end of the combustion chamber walls and converging therefrom to a nozzle throat of reduced cross-sectional area, the walls of said nozzle being composed of a porous but hard, prefired ceramic refractory body, and an exit cone adjoining said nozzle, said exit cone walls being composed of a dense, hard prefired ceramic refractory body, the aforesaid combustion chamber, nozzle and exit cone being encased in axial alignment in an outer cylindrical metal shell and seated therein by an intervening mass of refractory cement, at least that portion of the refractory cement backing up the nozzle walls of the device having an open porous body structure, and cooling means embedded in said refractory cement encircling the nozzle walls for introducing a fluid coolant to the refractory walls of said nozzle.

4. A device for the combustion and directional release of hot gases comprising a combustion chamber having the walls thereof composed of a dense, hard, prefired ceramic refractory body, a discharge nozzle adjoining the combustion chamber with the end of the nozzle abutting the forward end of the combustion chamber walls and converging therefrom to a nozzle throat of reduced cross-sectional area, the walls of said nozzle being composed of a porous but hard, prefired ceramic refractory body, and an exit cone adjoining said nozzle, said exit cone walls being composed of a dense, hard prefired ceramic refractory body, the aforesaid combustion chamber, nozzle and exit cone being encased in axial alignment in an outer cylindrical metal shell and seated therein by an intervening mass of refractory cement, and cooling means embedded in said refractory cement encircling the nozzle walls, said cooling means comprising a ring-shaped metal tube provided with a plurality of apertures spaced about its inner periphery, said metal tube being suitably connected to a lead-in tube extending through said metal shell.

5. A rocket motor structure comprising a combustion chamber, a discharge nozzle and an exit cone, said parts being composed of inner ceramic refractory lining walls backed up by a mass of refractory cement encased by an encircling metal shell, said combustion chamber and exit cone walls being dense in character said nozzle walls being porous in character, and hollow conduit means within said mass of refractory cement and encircling said nozzle walls for introducing a fluid coolant to the refractory walls of said nozzle.

6. A rocket motor structure comprising a combustion chamber, a discharge nozzle and an exit cone, said parts being composed of inner ceramic refractory lining walls backed up by a mass of refractory cement encased by an encircling metal shell, said combustion chamber and exit cone walls being dense in character said nozzle walls and the refractory cement surrounding said nozzle walls being porous in character whereby fluid coolant introduced therein will permeate the structure thereof, and means for introducing fluid coolant thereto.

7. A rocket motor structure comprising a combustion chamber, a discharge nozzle and an exit cone, said parts being composed of inner ceramic refractory lining walls backed up by a mass of refractory cement encased by an encircling metal shell, said combustion chamber and exit cone walls being dense in character said nozzle walls and the refractory cement surrounding said nozzle walls being porous in character whereby fluid coolant introduced therein will permeate the structure thereof, and means for introducing fluid coolant thereto, said means comprising an apertured hollow metal conduit, said conduit being embedded within said refractory cement and encircling the nozzle walls and provided with a connection to the exterior of said metal shell.

8. A rocket motor structure according to claim 5 in which the inner refractory lining is of a bonded silicon carbide composition.

9. A device for the combustion and directional release of hot gases comprising a combustion chamber having the walls thereof composed of a dense, hard, prefired ceramic refractory body, a discharge nozzle adjoining the combustion chamber with the end of the nozzle abutting the forward end of the combustion chamber walls and converging therefrom to a nozzle throat of reduced cross-sectional area, the walls of said nozzle being composed of a hard, prefired ceramic refractory body of good thermal conductivity, and an exit cone adjoining said nozzle, said exit cone walls being composed of a dense, hard prefired ceramic refractory body, the aforesaid combustion chamber, nozzle and exit cone being encased in axial alignment in an outer cylindrical metal shell and seated therein by an intervening mass of refractory cement containing over 50% silicon carbide, and cooling means embedded in said refractory cement encircling the nozzle walls.

10. A rocket motor structure according to claim 9 in which the inner refractory lining is of a bonded silicon carbide composition.

KENNETH C. NICHOLSON.

References Cited in the file of this patent
UNITED STATES PATENTS

| Number | Name | Date |
|---|---|---|
| 1,635,819 | Corcoran | July 12, 1927 |
| 1,861,213 | Greene | May 31, 1932 |
| 2,354,151 | Skoglund | July 18, 1944 |
| 2,405,785 | Goddard | Aug. 13, 1946 |
| 2,406,926 | Summerfield | Sept. 3, 1946 |
| 2,476,185 | Goddard | July 12, 1949 |
| 2,487,588 | Price | Nov. 8, 1949 |
| 2,500,334 | Zucrow | Mar. 14, 1950 |
| 2,548,485 | Lubbock | Apr. 10, 1951 |